Patented Sept. 25, 1923.

1,468,828

UNITED STATES PATENT OFFICE.

OTTO NAJACHT, OF CHICAGO, ILLINOIS.

ALLOY.

No Drawing.  Application filed February 10, 1922. Serial No. 535,629.

*To all whom it may concern:*

Be it known that I, OTTO NAJACHT, a subject of Germany, residing at Chicago, in the county of Cook and State of Illinois, have invented new and useful Improvements in Alloys, of which the following is a specification.

This invention has for its object to produce an alloy resembling bronze in appearance, but possessing greater tensile strength, and capable of being cut smoother and much faster than ordinary bronze, although being somewhat harder.

The alloy is composed of the following ingredients:

| | |
|---|---|
| Copper | 3 pounds. |
| Brass | 8 ounces. |
| Aluminum | 1½ ounces. |

The materials stated are all placed in a crucible with a flux of oyster shells, 1 ounce, and lard, 1 ounce, and melted by placing the same in a suitable furnace.

The finished product is slightly lighter in color than ordinary bronze, and although it is somewhat harder, it can be machined much more readily.

The oyster shells and the lard are used as a flux to promote the fusing of the metals, the same being perfectly blended and a decided smoothness in the texture of the finished product being obtained. It will be understood of course that ordinary lime may be substituted for the oyster shells.

The brass used in the composition is ordinary brass as used in the industries and readily obtainable in the open market. A brass of this kind shows on analysis to be composed approximately of copper, 65.83%; lead, 2.31% and zinc, 31.71%.

I claim:

An alloy consisting of copper, 3 pounds; aluminum, 1½ ounces; and the constituents of ordinary brass to the amount of 8 ounces.

In testimony whereof I affix my signature.

OTTO NAJACHT.